(No Model.)
J. W. SMALLMAN.
VELOCIPEDE.
No. 366,638. Patented July 12, 1887.
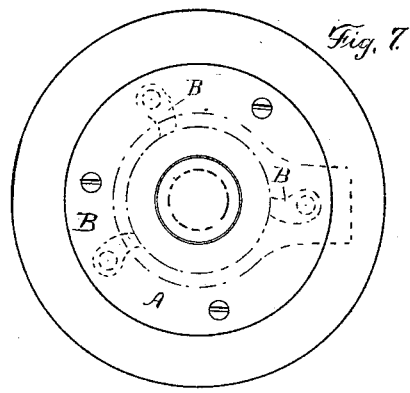
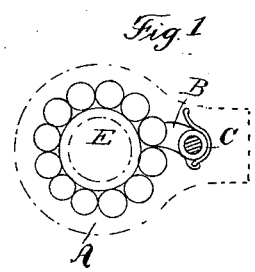
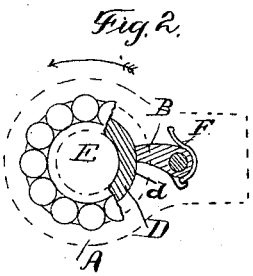
Attest:
C. W. H. Brown,
Frank Brawner,
Inventor:
James W. Smallman
By Wallace A. Bartlett
atty.

United States Patent Office.

JAMES W. SMALLMAN, OF NUNEATON, COUNTY OF WARWICK, ENGLAND.

VELOCIPEDE.

SPECIFICATION forming part of Letters Patent No. 366,638, dated July 12, 1887.

Application filed March 15, 1887. Serial No. 230,892. (No model.) Patented in England March 20, 1885, No. 3,596.

*To all whom it may concern:*

Be it known that I, JAMES WILLIAM SMALLMAN, a subject of the Queen of Great Britain and Ireland, residing at Camp Hill Grange, Nuneaton, in the county of Warwick, England, have invented certain new and useful Improvements in Safety Mechanism for Velocipedes, (for which I have obtained Letters Patent in Great Britain, No. 3,596, dated March 20, 1885,) of which the following is a specification, reference being had therein to the accompanying drawings.

This invention relates to velocipedes, and is specially intended for bicycles of the ordinary well-known form containing a driving-wheel and a trailing wheel coupled to it in the usual way, though the invention may be applied to other forms of bicycles and tricycles.
The object of this invention is to make the machine safer to ride by lessening the risk of a fall in a forward direction, and, should such an accident occur, to mitigate its effects by reducing the speed.
This invention consists of a connection between the frame of the machine and the hub of the driving-wheel, which said connection becomes operative as a clutch when the driving-wheel is checked in such a manner that the frame rises from its normal position. The clutch then engages with the wheel, which is urged forward.

In the drawings, Figure 1 is a diagram showing, partly in section, the bearing-case and pawl, which latter operates on a collar attached either to the hub or to the axle. Fig. 2 is a section through the axle and collar, showing the pawl resting in a groove in the said collar. Figs. 3, 4, 5, and 6 are details of the pawl and its spring, showing various modifications of the same. Fig. 7 illustrates a modification in which the pawls are attached to the hub and act on a collar on the bearing-case.

A is the bearing-case, attached to or forming part of the frame of a bicycle or other velocipede. This bearing-case in Figs. 1 and 2 carries a pawl or catch, B, pivoted at C about a strong pivot. The said pawl or catch B rests on a collar, D, which is either attached to the hub or to the axle E of the machine.

As shown in Fig. 2, the pawl or catch B has its free end resting in a groove, $d$, in the hardened collar D, thus forming a silent ratchet braced against side movement.

The spring F holds the pawl B against the hardened collar, in order to cause it to grip the said collar whenever there is a tendency for the frame to move in the direction indicated by the arrow. The pawl B thus becomes a clutch, and, if the rotation of the collar D is suddenly stopped, the frame is held from overrunning the wheel, (to which the said collar is rigidly connected,) and the said wheel will in most cases be urged forward either past or over the obstruction.

The pawls B in Fig. 7 are pivoted in the hub and work on a collar attached to the bearing-case. The position of the pawls is consequently reversed; but the operation of the mechanism remains the same.

The device may either be attached to the hub or to the frame in close promity thereto, and so inclosed that it will be protected from sand and dust.

It is obvious that many modifications may be made in the form of the said pawl or clutch mechanism.

I do not claim the use of a device acting directly on the rim or rims of the wheel or wheels.

What I claim as my invention, and desire to secure by Letters Patent, is—

1. The combination, with the frame of a velocipede, of a pawl pivoted thereto, and a hardened collar attached to the wheel-hub or axle, in which said pawl bears.

2. In a velocipede, the combination of the frame, a spring-pawl pivoted thereto, the wheel-hub, and a grooved collar attached to the wheel-hub, in which groove the free end of the pawl rests, substantially as described.

JAMES W. SMALLMAN.

Witnesses:
 C. W. LEES,
 EDMUND S. SNEWIN.